United States Patent [19]

Bortolin et al.

[11] Patent Number: 5,037,179
[45] Date of Patent: Aug. 6, 1991

[54] INTERCONNECT SYSTEM FOR COUPLING RIBBON OPTICAL FIBERS AND METHOD OF MAKING THE SAME

[75] Inventors: Bruno Bortolin, Cinisello Balsamo; Paolo Boero, Milan, both of Italy

[73] Assignee: Societa' Cavi Pirelli S.p.A., Milan, Italy

[21] Appl. No.: 555,907

[22] Filed: Jul. 20, 1990

[30] Foreign Application Priority Data

Jul. 24, 1989 [IT] Italy ............................ 21276 A/89

[51] Int. Cl.⁵ ........................................... G02B 6/40
[52] U.S. Cl. ...................................................... 385/54
[58] Field of Search ............... 350/96.20, 96.21, 96.22

[56] References Cited

U.S. PATENT DOCUMENTS

| | | | |
|---|---|---|---|
| 4,279,468 | 7/1981 | Turley et al. | 350/96.22 |
| 4,597,631 | 7/1986 | Flores | 350/96.22 |
| 4,921,325 | 5/1990 | Iri et al. | 350/96.22 |
| 4,973,127 | 11/1990 | Cannon et al. | 350/96.22 |
| 4,983,012 | 1/1991 | Saito et al. | 350/96.22 |

Primary Examiner—William L. Sikes
Assistant Examiner—Robert E. Wise
Attorney, Agent, or Firm—Brooks Haidt Haffner & Delahunty

[57] ABSTRACT

An interconnect system for ribbon-joined optical fibers includes two connectors (1, 2) integrally attached to the ends of respective optical fiber ribbons (3, 4), in which each connector (1, 2) consists of a pair of coupled metal plates (5) rigidly fastened to each other, between which two or more optical fibers (7) belonging to a ribbon (3, 4) made of parallel optical fibers as well as alignment plugs (10) are clamped. At least a plate (5) in each connector (1, 2) includes an element made of metallic material in which several housing grooves (6, 9) for the optical fibers (7) of the ribbon (3, 4) and for the alignment plugs (10) are formed by cold plastic deformation using the same punch for all the plates belonging to one series. The method of accomplishing the invention includes making several grooved plates (5) by plastic deformation using a single punch; coupling a grooved plate (5) to a second plate and interposing therebetween the optical fibers (7) which are part of an optical fiber ribbon (3, 4) and on a length of which the common covering has been removed, partially housing the fibers (7) in the respective grooves (6); inserting a metered amount of hardening adhesive between the plates (5) clamped against the fibers (7); grinding the end surface of the plates (5) from which the fibers (7) issue; and introducing at least an alignment plug (10) into a respective groove (9).

44 Claims, 4 Drawing Sheets

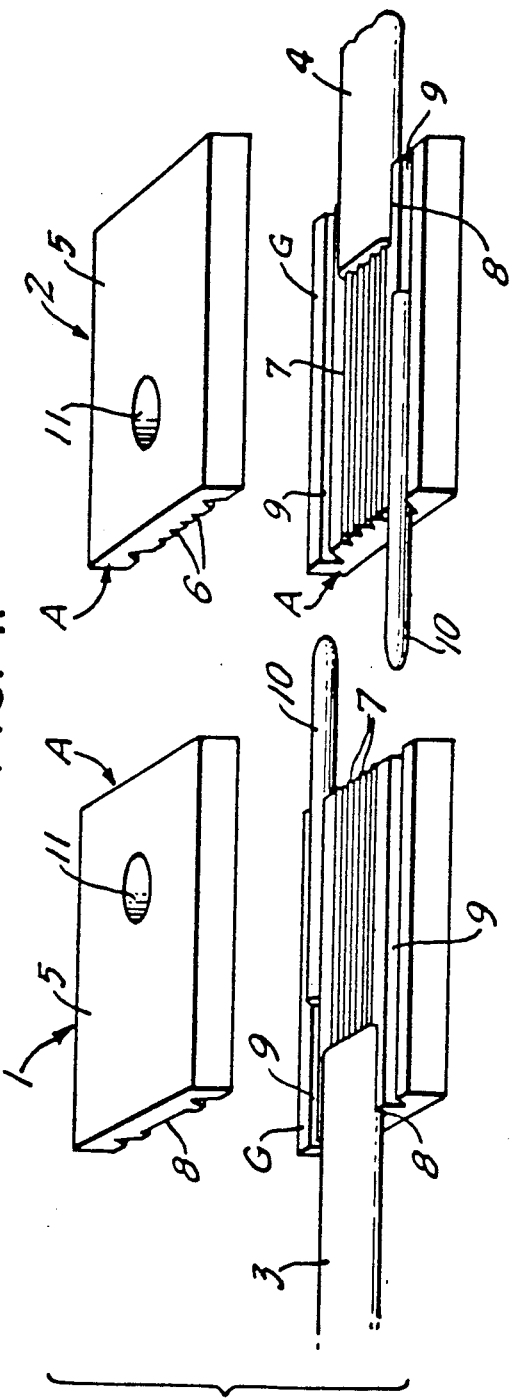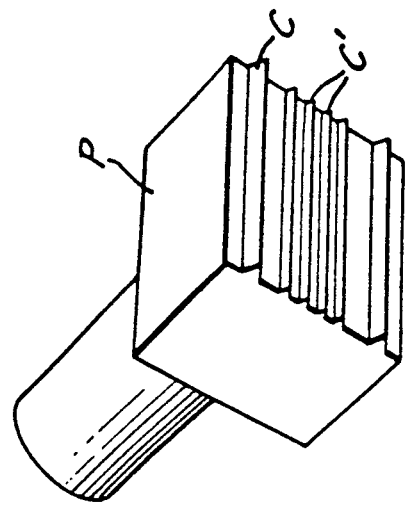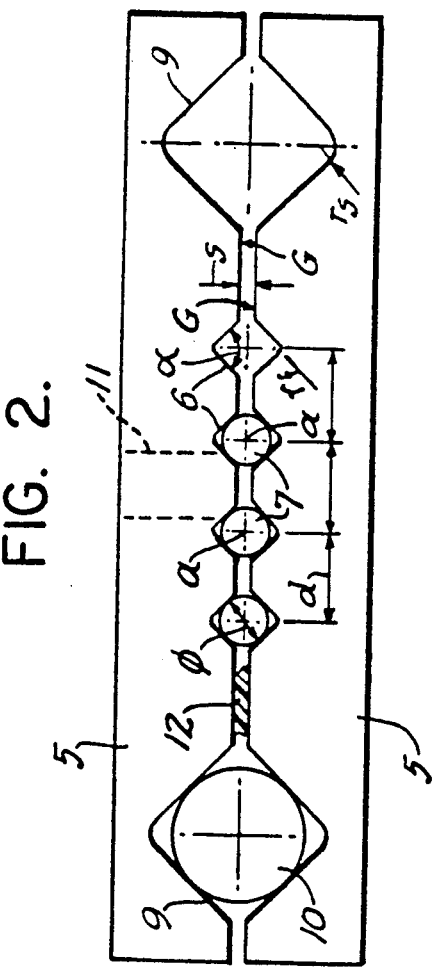

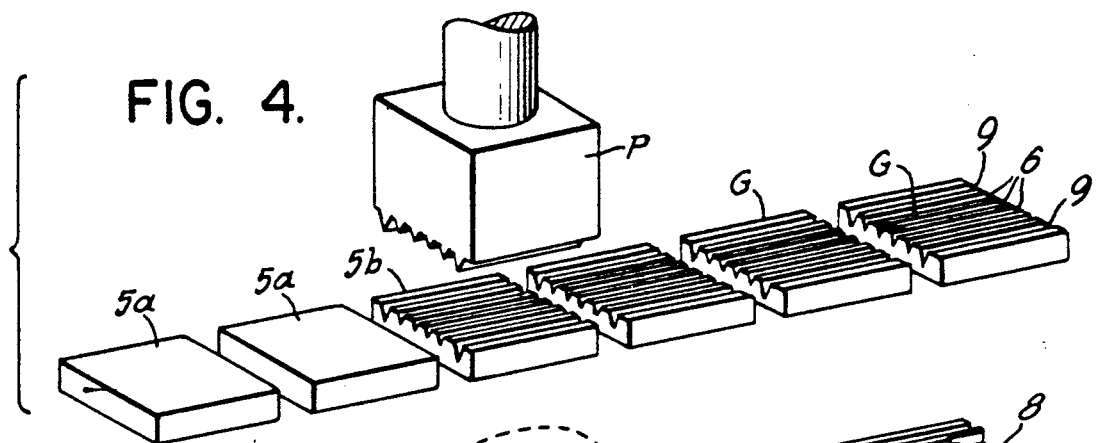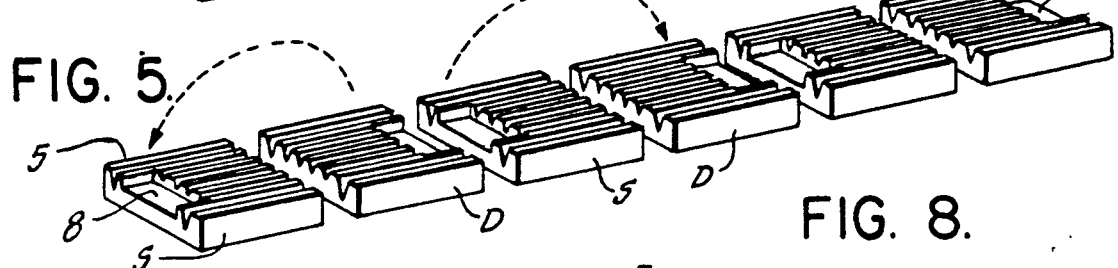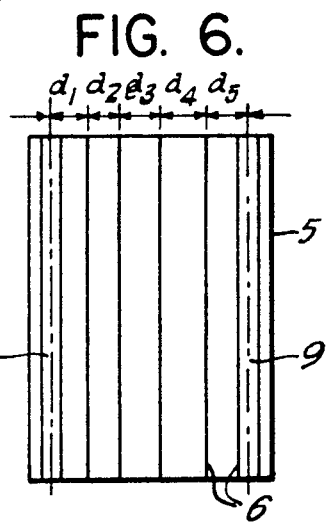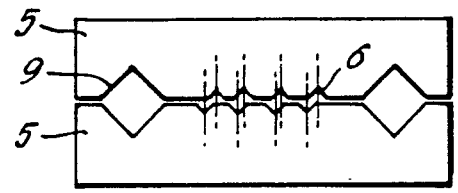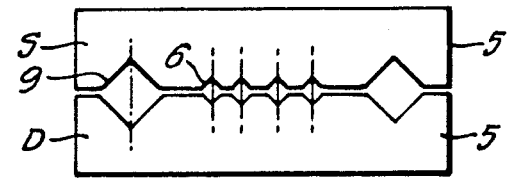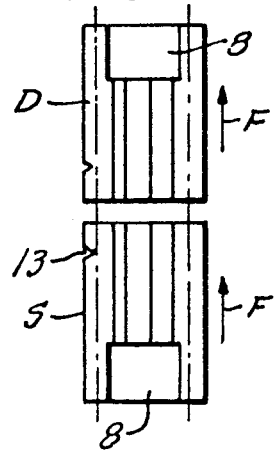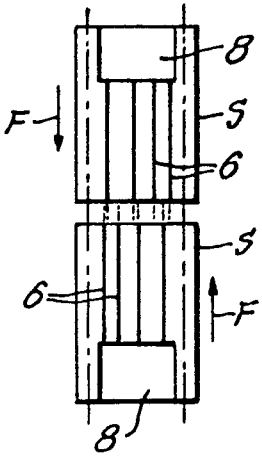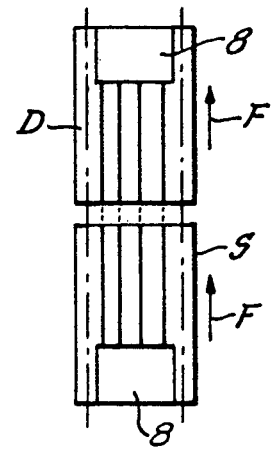

ND METHOD OF
INTERCONNECT SYSTEM FOR COUPLING RIBBON OPTICAL FIBERS AND METHOD OF MAKING THE SAME

BACKGROUND OF THE INVENTION

1. Field Of The Invention

The present invention relates to a connecting unit for ribbon-joined optical fibers and to a method of making the same.

2. Description Of The Prior Art

To connect two optical cables of the "ribbon type" to each other, that is cables in which several optical fibers are disposed parallel to each other and united together by a single plastics covering so as to form a ribbon and one or more ribbons are joined to form the cable, it is necessary to dispose each optical fiber of a ribbon forming one cable in alignment with the corresponding fiber of a ribbon forming the other cable, so as to allow light to pass from one fiber to the other while minimizing dispersions and attenuations of the transmitted signal resulting from faults in fiber alignment.

In order to achieve such alignment simultaneously in all fibers forming the ribbon, the end of the ribbon itself is conveniently fitted into a rigid body, referred to as a connector, which keeps the fibers in a geometrically definite position. Thus, two connectors forming a pair are disposed and held in a confronting relationship and so aligned that the respective fibers can take the correct position for forming the optical connection.

Due to the requirements for connections which achieve the best alignment between all the fibers of the ribbon in order to minimize the attenuation of the light signal when passing through the connection, it is necessary to establish very reduced tolerances as regards possible coaxial faults or misalignments between the fibers of each interconnected pair and, as a result, very reduced tolerances in the sizes and positions of the housings for the fibers themselves in the connectors. In particular, by way of example, to connect ribbons made of single-mode fibers in which the diameter $\phi$ of the cladding of each fiber is 125 $\mu$m and the mode diameter is equal to 9.5 $\mu$m, the coaxial faults or misalignments of the axis of a fiber in a connector related to the axis of the corresponding fiber in the facing connector must not be higher than one $\mu$m; so that in most cases the signal attenuation at the connection is lower than 1 dB, which is deemed to be the maximum acceptable loss value in the connection.

Making connectors having such high accuracy requirements is quite a delicate operation, taking particularly into account the fact that it is necessary to produce a great number of connectors to be matched, while ensuring the same qualitative alignment value to all of them.

Connectors are known in which the optical fibers are housed inside the grooves of a plate made of a crystalline material which are obtained during several steps by localized etching, at positions defined by protection templates. Therefore, in order to achieve the very high accuracy in size required for the housing grooves in a plate, the position and shape of which directly establishes the axis position of the fiber contained therein, particularly delicate and expensive working processes are required in producing such plates.

Also known (see European Patent Application EP 0 241 724) are optical connectors with coupling plugs which include a base plate provided with grooves to receive the optical fibers and guide plugs to which a flat plate of smaller sizes is fastened. The plates define holes between each other and the guide plugs and fibers are subsequently introduced into the holes.

In order to make the fit of the fibers in the respective holes possible, the base plate has an uncovered portion the grooves of which represent a guide for the introduction of the fibers. These connectors are made of a hard and brittle material, such as crystalline silicon or ceramic and the grooves are formed by removal of material by means of very precise grinding machines which ensure the requested tolerance values, necessary for the optical coupling of the fibers.

In order to make connectors of this kind particular working techniques and machinery to be used for producing each individual base plate are required. In addition the plates can exhibit differences in sizes resulting from the precision limits offered by the machines used for their production, because it is particularly complicated and expensive to keep these machines within the admissible tolerance values for an acceptable optical coupling.

Furthermore, in connectors in accordance with the aforementioned patent application, by coupling a base plate to a flat plate elements provided with holes in which the fibers must be subsequently inserted are provided, which means that a certain clearance between the fibers and the related holes, as well as between the plugs and the related holes must always be available. This clearance which is necessary for introducing the fibers into the holes, in particular when the operation is carried out in the field, is however to the detriment of the precision in the optical alignment at the connection point and adds to the other inexactitudes in size, some of which have already been mentioned above.

Also known are connectors described in U.S. Pat. No. 3,864,018 in which the connectors consist of identical plates provided with several parallel grooves coupled to each other so as to clamp the interposed optical fibers housed in the grooves and keep them in the desired geometrical position. In this structure, however, the coupling is provided between two connectors located at the ends of respective optical fiber ribbons through outer alignment elements in contact with the plate surfaces opposite those clamping the optical fibers. As a result, fibers between two coupled connectors are subjected to an imperfect alignment due to inexactitudes in the plate thickness which can be hardly avoided and which add to the other working inexactitudes of the grooves. As a result, the structure in accordance with this patent is only suitable for connectors which do not need too much accuracy, in the case of multimode fibers, for example.

SUMMARY OF THE INVENTION

Therefore, the purpose of the present invention is to solve the technical problem involving connecting elements required to insure very precise optical alignment in connections, while avoiding the alignment faults due both to the working tolerances and to the presence of clearances between the fibers and the respective guide housings, by adopting a process entailing relatively low costs, and at the same time ensuring the interchangeability between the connectors of each series and where the connectors can offer a faultless mounting whether it is carried out at the factory or in the field.

It is an object of the present invention to provide an interconnect system for ribbon-joined optical fibers comprising two connectors integral to the ends of respective optical fiber ribbons consisting of at least two parallel optical fibers enclosed in a single outer covering, each connector being provided with a coupling face in contact with the corresponding face of the other connector. The fibers are in alignment and have a coupling face through the ends of which the optical fibers of the respective ribbon come out. Each connector consists of a pair of coupled plates rigidly fastened to each other and clamping two or more optical fibers belonging to a ribbon made of parallel optical fibers as well as an alignment plug means. At least one plate in each connector comprises an element made of a plastically deformable metallic material provided with housing grooves for the optical fibers of the ribbon from which the common covering has been removed and for the alignment plug means, which grooves have been formed therein by cold plastic deformation using the same punch for all the plates which are part of an interchangeable series, the alignment plugs and the fibers of the fiber ribbon being accommodated within the respective grooves with a portion projecting to the outside of the grooves. An empty space is left between the faced surfaces of the connector plates clamping the fibers and the alignment plugs, into which space a metered amount of adhesive resin susceptible of hardening is introduced.

At least a plate for each connector has a pair of alignment grooves of substantially triangular section on one surface thereof, which grooves are adapted to partially accommodate respective alignment plugs. Located between these alignment grooves are two or more grooves of substantially triangular section adapted to partially receive corresponding optical fibers of a fiber ribbon from which the common covering has been removed (bare optical fibers), the grooves being formed by cold plastic deformation.

Each plate at one end thereof has a slot adapted to accommodate a length of covered optical fiber ribbon contiguous to the bare fiber length located in the grooves. The slot in each plate provided with grooves is made at a definite position with respect to the longitudinal orientation of the plate at the moment of forming the grooves.

Preferably the slots in the plates are alternatively formed at either end of the plates, depending upon the longitudinal orientation of the plate when the grooves are being formed, an identification means for identifying this orientation being provided on the plates when the slots are formed. The identification means for identifying the orientation of the plates consists of marks associated with the plate and independent of the respective grooves. Said marks comprise side notches, colorings, side asymmetries and the like, and said means may also be embodied by differently sized grooves designed to house the alignment plugs in each plate.

The positions of the slots relative to the orientation of the plates define two groups of plates, designated as right and left plates respectively, two connectors being coupled to each other with at least a respective right plate in alignment with a left plate.

According to a preferred embodiment, each connector is formed with two plates each having a surface provided with grooves adapted to accommodate alignment plugs and optical fibers, the plates being coupled to each other so that the respective grooved surfaces face each other and the grooves are in register. The grooves in each plate are designed to accommodate the plugs and the optical fibers, being dimensioned so as to receive said plugs and fibers with the respective axes in coplanar relation, overlying the surface of the plate itself in which the grooves are formed.

In this embodiment each connector is formed with two plates, left and right respectively.

At least the plate grooves adapted to accommodate the optical fibers have sides with flat portions, at least at the area in contact with the fibers, forming a dihedral the apex angle of which ranges between 80° and 100°.

At least a plate for each connector has a hole in the middle for inserting metered adhesive material susceptible of hardening between the plates of the connector itself.

According to an alternative embodiment a connector is formed with a plate having one surface provided with grooves adapted to receive alignment plugs and optical fibers coupled and fastened to a plate of identical width having a flat surface in the area overlying the fibers, the optical fibers being clamped between the groove sides and said flat surface.

The grooves designed to receive the plugs and the optical fibers in each grooved plate can be dimensioned so as to receive the plugs and fibers with a common tangent plane, in each connector the grooved plate being coupled to a plate having one flat surface in contact with the fibers and the alignment plugs.

In the above embodiment the two coupled connectors have a plate provided with right grooves and a plate provided with left grooves respectively.

According to a modification to the preceding embodiment, the grooves adapted to receive the plugs and the optical fibers in each grooved plate are dimensioned so as to accommodate the plugs and optical fibers with the respective axes in coplanar relationship, the grooved plates each being coupled to a plate having recessed surfaces at the respective contact areas with the alignment plugs.

In this modified embodiment, the slots in the grooved plates can be alternatively formed at either end of the plates depending upon the longitudinal orientation of the plate when the grooves are formed and two connectors having a right grooved plate and a left grooved plate respectively are coupled to each other as in the preceding case, or said slots can be formed on the same side relative to the orientation of the plates when the grooves are formed.

In the preceding two modifications of the alternative embodiment, at least the grooves in the plates adapted to receive the optical fibers have sides with flat portions, at least at the area in contact with the fibers, forming a dihedral the apex angle of which ranges between 50° and 90°. Preferably the plate having a substantially flat surface in the area overlying the fibers, at its portions designed to overlie the alignment plugs is provided with respective areas having a reduced thickness so as to allow the elastic flexural deformability of said portions.

The method of forming connectors for detachable connecting groups to be used with ribbon-joined optical fibers includes the steps of stamping a plurality of plates with a punch having a predetermined profile comprising several parallel or substantially parallel ridges the plates being made of metallic material and formed by said punch by cold plastic deformation, said plates on one face having an impression corresponding to the punch and provided with several parallel or substantially parallel grooves; accommodating the optical fibers belonging to an optical fiber ribbon, on a length of which the common covering has been removed, into some of the grooves of one plate inside which they are partially contained; associating a grooved plate with a second plate, clamping the fibers between the associated plates; applying a metered amount of adhesive susceptible of hardening between the two plates and keeping the plates clamped against the optical fibers until the adhesive has hardened; grinding the surface of the assembly where the fiber ends come out; and introducing at least an alignment plug into one of said grooves clear of said optical fibers.

The punch used, at least for one series of grooved plates, is unique and common to all the grooved plates.

In addition and conveniently the method provides for the grooved plates produced by the punch to be periodically controlled, the punch being replaced when the groove sizes come close to the predetermined tolerance values.

On the grooved face of a plate, before its being joined to the other plate, a slot is formed by removal of material at a definite location relative to the orientation of the plate during the formation of the grooves.

Applied to the grooved plate is an identification mark relative to the position of the slot with respect to the orientation of the plate when the grooves are formed.

According to the method of the invention, two grooved plates made with the same punch and in which the slots are located at opposite positions relative to the orientation of the plate when the grooves are formed, can be superimposed, so as to clamp the optical fibers of the optical fiber ribbon.

Alternatively, a grooved plate and a plate with a flat surface in the area overlying the fibers can be superimposed with each other.

BRIEF DESCRIPTION OF THE DRAWINGS

The above and other objects of the invention and the various features and details of the construction and operation thereof are hereinafter fully set forth and described with reference to the accompanying drawings, in which:

FIG. 1 is an exploded view of a connecting group for optical ribbon-joined cables in accordance with the invention, consisting of two connectable connectors;

FIG. 2 is a front elevational view of a connector;

FIG. 3 shows a punch adapted to form the grooved plates according to the invention;

FIG. 4 shows the working steps for the formation of the grooved plates by use of the punch shown in FIG. 3;

FIG. 5 shows the working steps for the formation of the slots in the grooved plates and how the pairing of the plates takes place;

FIG. 6 is a top plan view of a plate after coining (or plastic metallic deformation) when center-to-center faults are present;

FIG. 7 shows a pair of plates in the working state seen in FIG. 4 and oriented for subsequent working;

FIG. 8 shows a pair of plates faced to form a connector in the presence of center-to-center faults, in a wrong coupling position;

FIG. 9 shows the connector seen in FIG. 8 with properly coupled plates;

FIG. 10 shows the corresponding plates of two connectors designed to be coupled to each other, in a condition of wrong orientation;

FIG. 11 shows the plates of the connectors shown in FIG. 10 in a correct orientation;

DESCRIPTION OF THE PREFERRED EMBODIMENTS

Figure 12:
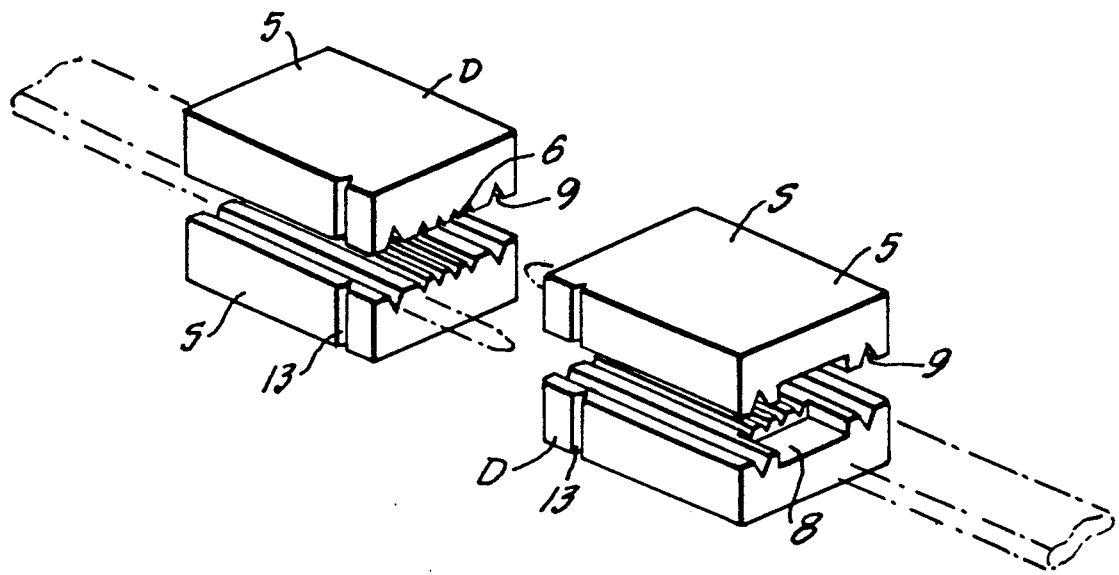
FIG. 12 is a perspective view of a pair of correctly faced connectors.

As shown in FIG. 1, the connection between two optical fiber ribbons in accordance with the present invention is made by means of a pair of connectors 1, 2 attached to the corresponding ends of the optical fiber ribbons 3, 4 and disposed in confronting relationship with respect to each other. The connectors 1, 2 are typically accommodated in an outer housing or, in any event, kept in mutual contact by an outer retaining means not shown as it is not part of the present invention.

Each connector 1, 2, shown in an exploded view in the drawings, consists of a pair of cooperating plates 5 similar to each other and provided with longitudinal grooves 6 into which the optical fiber bare ends 7 (i.e. the lengths devoid of the protecting outer covering plastics material so that the outer layer or cladding of the optical fibers is exposed) of ribbons 3, 4 are placed. A slot 8 formed at the end of each plate allows the end portion of the plastics covering of greater thickness to be housed therein.

In addition, a pair of further longitudinal alignment grooves 9 receives alignment plugs 10, preferably one for each connector, having a length to cause a plug portion to be introduced into the corresponding grooves of the other facing connector and through which the connectors themselves are coupled to each other at coupling end surfaces "A" so that an alignment condition in the connection is created.

The structure of a connector in accordance with the invention is shown in greater detail in FIG. 2. The plates 5 have opposing optical fiber securing surfaces G and have several elongate spaced parallel fiber-receiving grooves 6, each with V-shaped cross-sectional outline, within which the optical fibers 7 of the ribbon-joined cables 3 or 4 are received.

When two plates 5 are paired and mated as shown the fibers 7 are held within the inclined planes forming the grooves 6 themselves, their positions being defined by the geometrical aspects of the grooves.

The depth of the grooves 6 is established by the outer diameter $\phi$ of the fiber, so that a spacing "s" of predetermined value between the plates may be left. Since the plates are identical with each other, the axis "a" of the core of each fiber is disposed in an intermediate position between the plates.

One of the plates forming a connector or both of them are provided with a hole 11, more clearly shown in FIG. 1, through which a metered amount of adhesive hardening resin 12 is cast between the two plates 5 tightly held against the fibers 7 with a predetermined strength to form retaining means. The metered amount of resin fills the empty space having dimension "s" between the plates as well as the space between the grooves 6 around the fibers, rigidly attaching the two plates to each other and the fibers contained therein. An amount of adhesive is provided so that it may fill the area between the plates clamping the fibers without however reaching the grooves 9 so that the introduction thereinto of the plugs 10 is not hindered.

When the adhesive resin has hardened, the coupling end or front surface "A" of the connector thus formed, designed to make contact with the corresponding surface "A" of the connector mounted at the end of the other cable, is submitted to a grinding operation ensuring perfect flatness and smoothness of the optical fibers to be connected.

The plates 5 are preferably made of a metallic material deformable by cold plastic deformation, also referred to as coining.

The steps for forming the plates and connectors are diagrammatically shown in FIGS. 3, 4, 5.

By known and conventional workings, which therefore are not further described in detail herein, a punch P is manufactured as shown in FIG. 3, which is provided with projecting ridges C, C' adapted to form the desired grooves in the plates.

Starting from a flat plate 5a made of brass or aluminum, or in any event of a plastically deformable metallic material having sufficient stiffness and capable of undergoing a permanent cold plastic deformation by a punch, or starting from a ribbon made of the same material and of identical width and thickness to be subsequently cut according to the desired length, the grooved plates 5b are coined by the punch P, in which plates grooves 6 and 9 extend over the whole length.

The grooved plates 5b are then machined, for example, milled, so as to form slots 8 therein as shown in FIG. 5 in order to create plates ready to be assembled, generally identified by reference numeral 5.

Plates 5 can therefore be coupled to each other, as previously described, and therefore produce a finished connector.

The grooved plates 5 are coined in the desired number by the punch P which is itself formed by mechanical high precision working. By virtue of the above procedure, plates 5 are precisely equal to one another, at least a great number of pieces produced with the same punch are identical or similar before the punch becomes worn. Therefore, as regards connectors formed with such plates, complete compatibility and interchangeability is ensured with very reduced attenuation of the transmitted signal.

As the punch P is of one piece construction, it can be worked in a very precise manner. On the other hand, the connectors formed by adopting the above method can ensure coupling with the fibers in a condition of perfect alignment, as previously stated, even if the punch does not offer very high accuracy in size, in particular as far as the pitch between the grooves is concerned.

In particular, by forming the punch P by common mechanical precision working, in which the ridges adapted to give rise to the grooves 6, 9 in the plates coined by said punch are, for example, formed by a grinding operation on the punch itself, it is usually possible to keep a satisfactory degree of parallelism between the ridges C, C', and therefore between the plate grooves, whereas the precision of the machine tool used can be insufficient to ensure the center-to-center constancy between the different ridges of the punch, because the required tolerance is significantly reduced.

In this case, as shown in FIG. 6, where faults are magnified for the sake of graphic clarity, between the different grooves 6 and 9 it will be possible to have the following distances between centers $d_1$, $d_2$, $d_3$, $d_4$, $d_5$, the values of which deviate from the expected theoretical values.

According to the present invention, two identical plates obtained with the same punch are coupled to each other. In this way a possible lack of precision in the distance between the centers of two grooves can be ignored because the real center-to-center values are in any event kept constant in the different but associated or cooperating plates.

For this purpose two identical plates 5 made with the same punch are superimposed as shown in FIG. 9. By aligning the sides of the plates the grooves are also disposed so as to be coextensive or coincident. On the contrary, in case of reverse overlapping, as shown in FIG. 8, the grooves 6 will no longer be coincident and correct mounting of the fibers in the grooves will be prevented.

In order to ensure correct mounting of the plates according to the arrangement shown in FIG. 9, the plates, after coining, are given an appropriate orientation, a front part and a rear part being established for each of them. That is, a surface "A" is designed to face the contiguous connector and an opposite surface is designed to receive the fiber ribbon when a connector is formed with the plate. Therefore, for correct coupling the plates to be coupled must be selected with opposite orientations with respect to the direction according to which they have been coined.

This "front-to-rear" orientation can be conveniently defined by the slot 8 which can firmly establish the end of the plate where the fiber ribbon is to be inserted. As shown in FIGS. 5 and 7, a correct overlapping or superimposition can be achieved with plates in which the grooves 8 are oriented in opposite ways with respect to the direction of the plates themselves at the time of coining, shown by arrows F.

In order to ensure the identity of the plates to be coupled, after their front-rear orientation, they are also identified as right (D) and left (S) plates, with reference to the arrangement of the front and rear surfaces relative to the plate orientation at the time of coining.

For this purpose, the identification of the plates can be made by means of indicia marks etched on one of the sides, or different colorings, shapes or the like. For example, a notch 13 always etched on the same side relative to the coining orientation of the plates identified by arrow F is shown in FIG. 7.

The notch 13 can be disposed to the right of a person regarding the plates in the above defined front-to-rear direction or to his left as shown in FIG. 7 on the upper and lower plates respectively.

Under these conditions by coupling a right plate to a left plate so that slots 8 and notches 13 are on the same side, it is possible to have coincident grooves as shown in FIG. 9, which confirms correct mounting of the plates to easily form a connector.

According to a further embodiment, the identity and correct coupling of right and left plates can be achieved by providing asymmetrical alignment plugs, for example plugs having different diameters depending on whether they are located to the right or to the left of the fibers. In this case, the slots 8 being formed as shown in FIG. 7, an incorrect mounting of the plates appears impossible or in any event can be immediately recognized and the introduction of the plugs into the incorrect grooves is prevented.

The same above remarks are valid for the alignment of two connectors formed with the above described plates when the grooves have center-to-center faults. Thus, two corresponding plates in two connectors to be joined, when brought into alignment by plugs 10 and grooves 9 the axes of which are outlined by dash dot lines in the figures do not have grooves 6 in mutual alignment if they are both left (S) plates for example as shown in FIG. 10, whereas the grooves 6 are in mutual alignment if a left type (S) plate and a right type (D) plate are brought into register with each other, as shown in FIG. 11.

Therefore, as shown in FIGS. 5 and 11, for correct coupling between connectors, the plates of the two connectors to be coupled must have opposite or complimentary arrangements or configurations, that is a left (S) plate must always face a right (D) plate with mirror-image symmetry.

For example, as shown in FIGS. 7 and 12, it is possible to see if the notches 13 of each connector are placed in register with each other and if the notches in two connectors to be coupled are on the same side and therefore provide correct mating. In case of use of alignment plugs having different sizes or sections, the junction of two connectors can only take place when they have a correct arrangement.

By coining the plates, it is possible to provide the most desirable profiles for the grooves 9 and 6, as well as to enable the desired alignment of the fibers even in the presence of working imprecisions in the punch. In particular, in order to make the contact lines between the outer surface of the fibers 7 and the planes in which the grooves 6 are contained equally spaced apart from each other, a groove section in the form of an isosceles triangle is preferred, in which the apex angle $\alpha$ (FIG. 2) is in the range of 80° to 100°, and preferably equal to 90°.

The bottoms or troughs of grooves 9 and 6, beyond the area in which they may interfere with plugs 10 and fibers 7 respectively (e.g. at $r_s$ and $r_f$), can be rounded, bevelled or relieved, depending upon the working requirements of the punch. Similarly the edges between the groove sides and the plate plane remote from the contact positions with the fibers or plugs, can be rounded or chambered.

In addition, in case of particular requirements, the grooves can also have differently shaped sides, and curved, stepped or similar surfaces can be provided.

Figure 13:
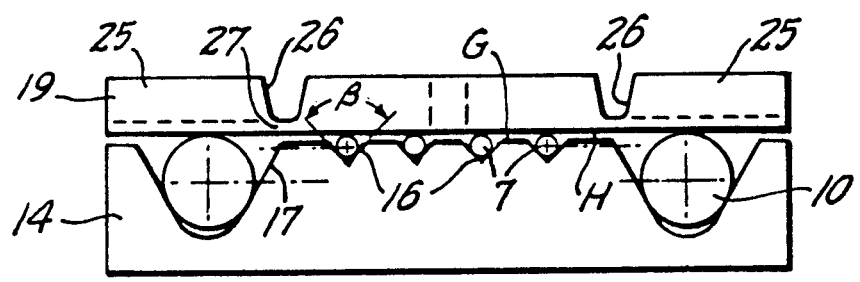
FIG. 13 is a front view of a connector, according to a different embodiment of the invention.
Figure 14:
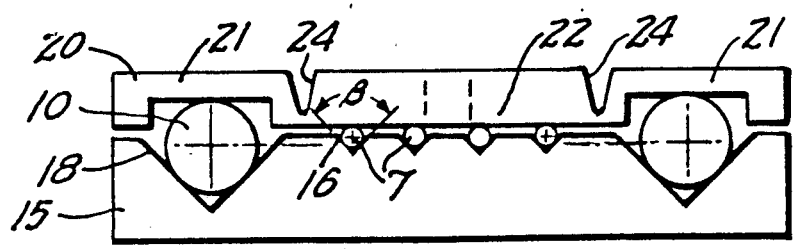
FIG. 14 is a front view of a connector, still in another embodiment.

According to an alternative embodiment of the present invention shown in FIGS. 13 and 14, it is possible to make a plate 14 or 15 by coining, provided with grooves 16 adapted to receive the fibers 7 and with grooves 17 or 18 for receiving the alignment plugs 10 respectively, and designed to form a connector when associated with a second plate of different form.

In the embodiment shown in FIG. 13 the plate 14 is associated with a covering plate 19 of identical or like width and having a flat surface "H". The grooves 16, 18 are formed to such a depth and inclination of the sides that they can receive the plugs 10 while keeping the upper tangent plane or surface "H" level and in contact with the tangent plane of the fibers 7.

Figure 15:
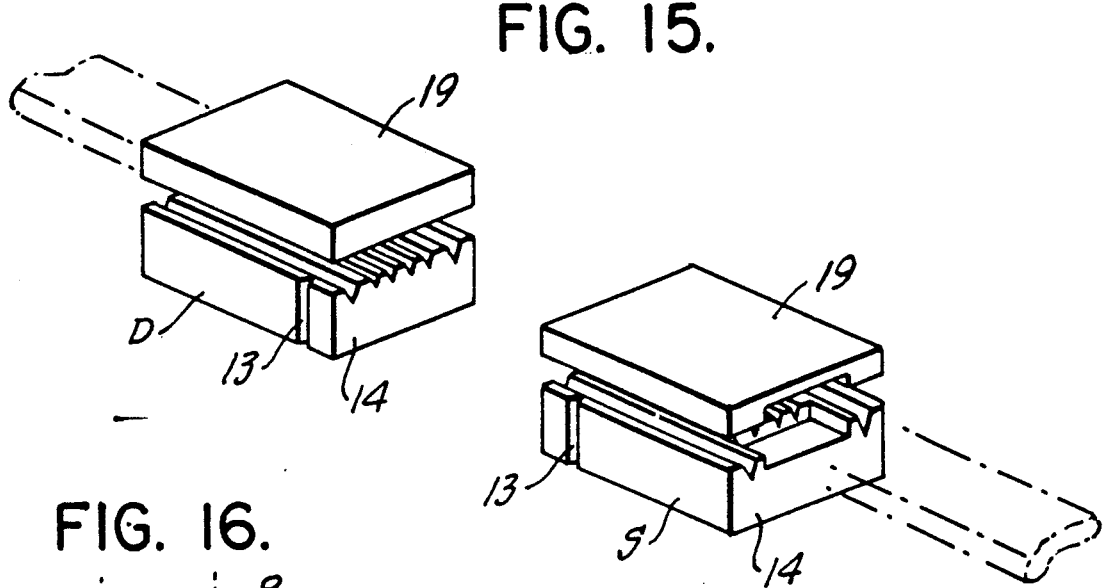
FIG. 15 shows two connectors according to the embodiment of FIG. 13 facing each other.

Since in this case the axes of the plugs 10 are not in coplanar relation with the axes of the fibers 7, when two connectors have to be coupled the corresponding plates 14 and 19 are disposed in confronting relationship with each other as shown in FIG. 15. The coupling of the connectors takes place with a right type plate in one case and with a left type plate in the other case, as already described with reference to FIG. 7.

The embodiment of FIG. 13 allows the fibers and plugs to be received with contact between three planes, so that redundant engagements are avoided and in this case it is only necessary to establish the flatness of the coupling surface to the fibers and plugs for plates 19.

In the embodiment shown in FIG. 14, on the contrary, a grooved plate 15 is provided which has respective grooves 16 and 18 for the fibers and alignment plugs 10, which are so dimensioned that the axes of the fibers and plugs are in substantially coplanar relation with each other. Associated with the plate 15 is an upper plate 20 shaped with a recessed area 21 in the region of each plug 10, which allows the fibers 7 and plugs 10 to be simultaneously clamped in their respective grooves while keeping their corresponding axes in substantially coplanar relation.

In making the plate 20 high precision required for forming the grooves in plate 15 is not necessary. In fact the width of areas 21 can have a wide tolerance while a fault in the distance between the plane of the area 22 in contact with the fibers and the plane of the areas 21 in contact with the plugs can be compensated for, due to a flexing elastic yielding of the plate 20 in its recessed areas 21 in the region of plugs 10, the position of the plug axis being ensured by the geometrical precision of the grooves 18.

In order to reduce the rigidity of plate 20 where required, so as to increase the flexing deformability of the plate itself, portions of reduced thickness in the plate can be provided and they are represented by grooves, cuts or the like 24 facilitating the localized bending of the plate side portions 21 overlying the plugs without transmitting important stresses to the area 22 overlying the optical fibers.

It may be convenient to provide a certain interference value between the plug 10 and the plane of the area 21 beforehand, in order to ensure a frictional engagement of the plug in its housing.

Likewise, plate 19 shown in FIG. 13 can be conveniently provided with side portions 25, overlying the alignment plugs 10, susceptible of elastic yielding, due to the presence of grooves or cuts 26 defining areas of reduced thickness 27 parallel to the grooves 16 and 17 and extending over the whole length of the plates 19 along which plate bending can take place without giving rise to strong stresses. Alternatively, the whole extension of the side portions 25 can be of reduced thickness, as shown in dash lines in the figure.

The material used to make the plate 19 or 20 can be different from that used for the underlying grooved plate 14 or 15, so as to exhibit a flexural behavior particularly suitable to the desired degree of elastic clamping for the plugs.

Due to the lower precision requirements needed to produce the plates 19 or 20, they can be made using different techniques, by drawing for example, and a grinding operation can be used, if necessary, only for the areas "A" designed to contact with the optical fibers.

Figure 16:
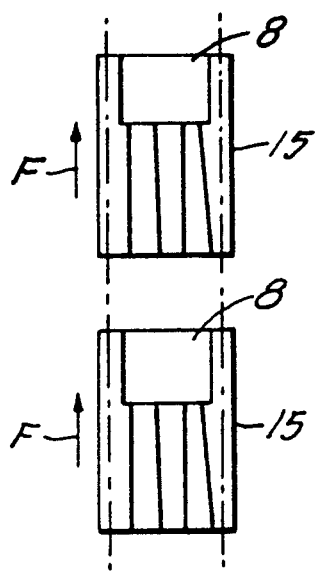
FIG. 16 shows a pair of plates having parallelism faults.
Figure 17:
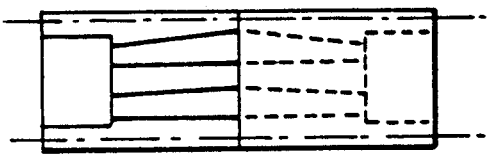
FIG. 17 shows a pair of connectors formed with the plates shown in FIG. 16 facing each other and showing coincident outlet positions of the grooves.
Figure 18:
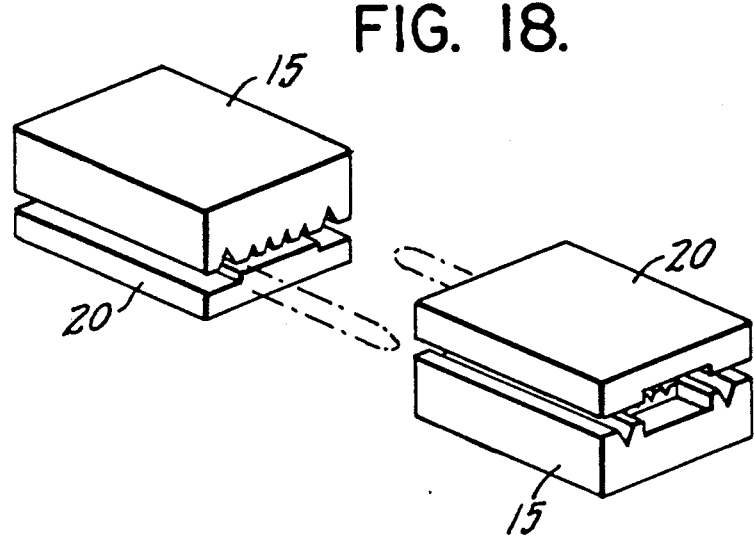
FIG. 18 is a perspective view of the connectors shown in FIG. 17.

The embodiment shown in FIG. 14 and providing for the alignment plugs 10 to be arranged so that their axes are in substantially coplanar relation with the axes of the optical fibers 7 may also be particularly suitable when a fault in the parallelism between the plate grooves is suspected as diagrammatically shown in FIG. 16 where such faults are magnified and in which two plates made with the same punch and oriented as shown by arrows F are represented. In fact, as diagrammatically shown in FIGS. 17 and 18, it is still possible to achieve the coincidence between the fiber housing grooves in the facing plates by using plates identical with each other to form the two connectors to be coupled and disposing a connector in such a manner that its respective plate 15 is turned over with respect to the corresponding plate 15 of the other connector and consequently the ends of the corresponding fibers can be correctly disposed in confronting relationship. The possible angle between the fibers has no consequences, as in any event its value is lower than a value susceptible of producing important attenuations in the transmitted signal.

In the embodiments shown in FIGS. 13 and 14 the angle $\beta$ of the surfaces forming the grooves 16 adapted to receive the fibers and grooves 17, 18 for receiving the plugs is preferably in the range of 50° to 90°, while different angles can be used for particular reasons.

While a particular embodiment of the present invention has been illustrated and described herein, it is not intended to limit the invention to such disclosure, and changes and modifications may be made therein and thereto within the scope of the appended claims.

The embodiments of the invention in which an exclusive property or provision is claimed are defined as follows:

1. An interconnect system for coupling two like flat ribbon optical cables each including at least two spaced parallel optical fibers enclosed in an outer covering which has been removed from the ends of the cables to expose predetermined length ends of the optical fibers to be optically coupled, comprising two connectors one for each cable, each connector being formed of a pair of cooperating plates each having a width at least equal to the width of the flat ribbon optical cables and a length at least equal to said predetermined lengths of the exposed ends of the optical fibers, each pair of cooperating plates being dimensioned to be superimposed in close proximity to each other and defining a coupling end surface dimensioned and configured to abut against a corresponding coupling end surface of another mating connector, each pair of cooperating plates of each assembled connector having opposed facing optical fiber securing surfaces at least one of which is provided with elongate spaced parallel fiber-receiving grooves extending along the length direction of said at least one plate and configured and dimensioned to receive at least portions of the optical fibers; and retaining means for maintaining each assembled pair of cooperating plates in close proximity to each other to capture the optical fibers between said facing securing surfaces in said fiber-receiving grooves, whereby a flat ribbon optical cable received through one end of a connector can be secured and the positions of the optical fibers of the cable can be maintained aligned at the other end of the connector to insure proper optical coupling to a mating connector at said coupling end surfaces.

2. An interconnect system as defined in claim 1, wherein corresponding grooves are provided on both said facing optical fiber securing surfaces of cooperating plates of each connector, each pair of associated grooves on said securing surfaces being aligned to at least partially receive an optical fiber.

3. An interconnect system as defined in claim 2, wherein said fiber receiving grooves are dihedral and triangular in cross-section and formed of flat sides converging at an angle within the range of 80° to 100°.

4. An interconnect system as defined in claim 2, wherein said grooves on cooperating plates are arranged with mirror-image symmetry to complement each other when said plates are superimposed to receive the optical fibers.

5. An interconnect system as defined in claim 1, wherein said fiber-receiving grooves are configured and dimensioned to receive only portions of the optical fibers thereby leaving remaining portions of the optical fibers projecting beyond said grooves to provide a spacing between said facing optical fiber securing surfaces in the assembled condition of the connectors.

6. An interconnect system as defined in claim 5, wherein said retaining means comprises adhesive means occupying said spacing and surrounding the optical fibers in said spacing.

7. An interconnect system as defined in claim 6, wherein said adhesive means comprises adhesive resin.

8. An interconnect system as defined in claim 1, wherein at least one plate of each pair of cooperating plates is made of a plastically deformable metallic material.

9. An interconnect system as defined in claim 1, further comprising alignment means for aligning one connector with another mating connector.

10. An interconnect system as defined in claim 1, further comprising alignment means for aligning optical fibers in one connector with optical fibers in a mating connector at said coupling end surfaces.

11. An interconnect system as defined in claim 10, wherein said alignment means comprises at least one longitudinal alignment groove in at least one plate of a connector which is substantially parallel to said fiber receiving grooves and extends at least to said coupling end surface, and an elongate alignment plug dimensioned to be received within said alignment groove and having a length to extend beyond said coupling end surface when received within said alignment groove to provide an extended plug portion which can be received within a corresponding alignment groove of an associated connector.

12. An interconnect system as defined in claim 10, wherein two alignment grooves are provided spaced from each other along the width direction of each connector, and two elongate alignment plugs one for each alignment groove, whereby the use of two spaced alignment plugs fixes the planes of the optical fibers in each connector in a common plane.

13. An interconnect system as defined in claim 12, wherein said fiber receiving grooves are arranged between said alignment grooves, at least one of said plates of each pair being elastically deformable to conform to said optical fibers and said alignment plugs when said connectors are assembled to thereby assure that said alignment plugs and said optical fibers are reliably retained within said connectors.

14. An interconnect system as defined in claim 13, wherein regions of reduced thickness are provided in said at least one of said plates to provide flexural deformability.

15. An interconnect system as defined in claim 14, wherein said regions of reduced thickness comprise elongate surface grooves formed between the regions of said fiber receiving grooves and said alignment grooves.

16. An interconnect system as defined in claim 12, wherein each alignment groove is of substantially triangular in cross-section and dimensioned to partially receive a respective alignment plug, and each fiber-receiving groove is of substantially triangular cross-section and each dimensioned to partially receive an optical fiber.

17. An interconnect system as defined in claim 1, wherein each plate of each connector is provided with a slot at the end of the connector where the flat ribbon cable is received at the end of the connector remote from the associated coupling end surface, said slot being dimensioned to receive a length of the flat ribbon cable with the outer covering contiguous to the exposed optical fibers received within said fiber receiving grooves.

18. An interconnect system as defined in claim 17, wherein said slots on associated plates are aligned in opposition to each other.

19. An interconnect system as defined in claim 17, further comprising identification means on each plate for identifying the ends of said plates on which said slots have been formed to facilitate and confirm correct orientation of the assembled plates and longitudinal alignment of said slots.

20. An interconnect system as defined in claim 19, wherein said alignment means comprises markings on each plate.

21. An interconnect system as defined in claim 20, wherein said markings comprise external notches provided in said plates.

22. An interconnect system as defined in claim 20, wherein said markings comprise colored indicia on said plates.

23. An interconnect system as defined in claim 20, wherein said markings comprise side asymmetries of said plates.

24. An interconnect system as defined in claim 20, wherein said markings comprise differently sized alignment grooves in said plates; and correspondingly sized alignment plugs received within respective alignment grooves and bridging two connectors to align the optical fibers in mating connectors with each other.

25. An interconnect system as defined in claim 1, wherein at least one of said plates is provided with alignment grooves substantially parallel to said fiber receiving grooves, and further comprising alignment plugs received within said alignment grooves for bridging two connectors to align optical fibers in mating connectors, said fiber receiving and alignment grooves being dimensioned to arrange the axes of said plugs and the optical fibers in a co-planar relation.

26. An interconnect system as defined in claim 25, wherein one facing optical fiber securing surface is provided with said fiber receiving grooves and the other facing optical fiber securing surface is a clamping surface, said grooves and clamping surface being configured to clamp the optical fibers and alignment plugs with their respective axes being arranged in co-planar relationship.

27. An interconnect system as defined in claim 26, wherein said alignment plugs have diameters greater than the diameters of the optical fibers and said clamping surface is provided with recessed surfaces at the contact areas to receive and accommodate said alignment plugs.

28. An interconnect system as defined in claim 1, wherein said fiber receiving grooves are dimensioned to only partially receive the optical fibers, each pair of cooperating plates being spaced from each other when assembled to receive the optical fibers, said retaining means comprising an adhesive material susceptible of hardening in said space between said plates, and a hole in at least one of each pair of plates for introducing said adhesive material into said space.

29. An interconnect system as defined in claim 1, wherein one facing optical fiber securing surface is provided with said fiber receiving grooves and the other facing optical fiber securing surface is a clamping flat surface, the optical fibers being partially received within said fiber receiving grooves in the assembled connector and being clamped between the sides of said grooves and said clamping flat surface.

30. An interconnect system as defined in claim 29, wherein said fiber receiving grooves are dihedral and triangular in cross-section and formed of flat sides converging at an angle within the range of 50° to 90°.

31. An interconnect system s defined in claim 29, further comprising alignment grooves in said at least one facing optical fiber securing surface which are substantially parallel to said fiber receiving grooves; and alignment plugs dimensioned to be received within said alignment grooves and to bridge said coupling end surface to another like mating connector, said grooves being dimensioned to arrange the optical fibers and said alignment plugs in a common tangent plane at the points of contact with said facing optical fiber securing surface.

32. An interconnect system as defined in claim 1, wherein each cooperating plate forming a connector has a predetermined orientation along the length direction which is a function of the orientations of said fiber receiving grooves, said plates being provided with a slot or recess at the same corresponding ends o said plates for receiving a length of the flat ribbon cable with the outer covering contiguous to the exposed optical fibers received within said fiber receiving grooves.

33. A method of forming a connector for interconnecting two like flat ribbon optical cables each including at least two spaced parallel optical fibers enclosed in an outer covering which has been removed from the ends of the cables to expose predetermined length ends of the optical fibers to be optically coupled, comprising the steps of forming a plurality of plates each having a width at least equal to the width of the flat ribbon optical cables and a length at least equal to said predetermined lengths of the exposed ends of the optical fibers and made of a plastically deformable metallic material; stamping each plate with a punch having a predetermined profile comprising a plurality of substantially parallel ridges to form on one facing surface of each plate an impression corresponding to said predetermined profile resulting in a number of substantially parallel grooves corresponding to said plurality of ridges; partially receiving the exposed ends of the optical fibers in associated grooves of one of said plates having a predetermined orientation with respect to reorientation of the punch; superimposing another plate over the first plate with a reverse orientation with respect to the orientation of the punch thereby arranging cooperating plates of a connector in mirror image symmetry to complement each other and provide aligned fiber receiving grooves when the connector is assembled; and securing associated plates to each other to maintain the optical fibers clamped to assure alignment of optical fibers optically coupled at coupling end surfaces of two mating connectors.

34. A method of forming a connector as defined in claim 33, wherein the step of securing comprises applying a metered amount of adhesive susceptible of hardening between two associated plates, and maintaining the plates clamped against the optical fibers until the adhesive has hardened.

35. A method of forming a connector as defined in claim 33, further comprising the step of grinding the coupling end surfaces where fiber ends extend to thereby improve mating between connectors.

36. A method of forming a connector as defined in claim 33, further comprising the step of aligning mating connectors to place the optical fibers therein in a common plane.

37. A method of forming a connector as defined in claim 36, wherein said aligning step comprises introducing at least one alignment plug into alignment grooves of associated plates which bridges a pair of mating connectors.

38. A method of forming a connector as defined in claim 33, wherein each associated pair of plates forming a connector is stamped with the same punch to provide nearly identical unique and common grooves.

39. A method of forming a connector as defined in claim 33, further comprising the step of replacing the punch when groove sizes exceed predetermined tolerance values.

40. A method of forming a connector as defined in claim 33, further comprising the step of removing material from grooved faces of the plates to form slots for receiving a portion of the flat ribbon optical cable with the outer covering when a pair of associated plates are superimposed.

41. A method of forming a connector as defined in claim 40, wherein said slots are formed during the stamping step when the grooves are formed.

42. A method of forming a connector as defined in claim 40, further comprising the step of marking the grooved plates relative to the positions of the slots with respect to the orientation of the plates when the grooves are formed.

43. A method of forming a connector as defined in claim 40, wherein slots are formed at opposite ends of an associated pair of plates; and re-orienting one plate to superimpose the plates and the slots formed thereon whereby the flat ribbon optical cable ends with the outer covering is received and clamped between a pair of opposing slots when the connector is assembled.

44. A method of forming a connector as defined in claim 33, wherein the optical fibers are clamped between opposing one of which is grooved and one of which is flat.

* * * * *